Dec. 27, 1927.

M. H. STARR

Re. 16,840

SCALE

Original Filed Jan. 20, 1920 8 Sheets-Sheet 1

INVENTOR
Morton H. Starr
BY
M. F. Garnett
ATTORNEY

Dec. 27, 1927.

M. H. STARR

Re. 16,840

SCALE

Original Filed Jan. 20, 1920 8 Sheets-Sheet 2

INVENTOR
Morton H. Starr
BY
M. F. Garnett
ATTORNEY

Dec. 27, 1927.

Re. 16,840

M. H. STARR

SCALE

Original Filed Jan. 20, 1920 8 Sheets-Sheet 3

INVENTOR

Morton H. Starr,

BY

M. F. Gannett

ATTORNEY

Dec. 27, 1927

Re. 16,840

M. H. STARR

SCALE

Original Filed Jan. 20, 1920 8 Sheets-Sheet 4

INVENTOR

Morton H. Starr

BY

M. F. Garnett

ATTORNEY

Dec. 27. 1927.

Re. 16,840

M. H. STARR

SCALE

Original Filed Jan. 20, 1920 8 Sheets-Sheet 5

INVENTOR

Morton H. Starr

BY

M. F. Garnett

ATTORNEY

Dec. 27, 1927. Re. 16,840

M. H. STARR

SCALE

Original Filed Jan. 20, 1920 8 Sheets-Sheet 6

INVENTOR

Morton H. Starr,

BY

M. F. Garrett

ATTORNEY

Dec. 27, 1927. Re. 16,840

M. H. STARR

SCALE

Original Filed Jan. 20, 1920 8 Sheets-Sheet 7

INVENTOR

Morton H. Starr

BY

M. H. Starr

ATTORNEY

Dec. 27, 1927 Re. 16,840

M. H. STARR

SCALE

Original Filed Jan. 20, 1920 8 Sheets-Sheet 8

INVENTOR
Morton H. Starr,
BY
M. F. Barnett
ATTORNEY

Reissued Dec. 27, 1927. Re. 16,840

UNITED STATES PATENT OFFICE.

MORTON H. STARR, OF ST. JOHNSBURY, VERMONT, ASSIGNOR TO E. & T. FAIRBANKS AND COMPANY, OF ST. JOHNSBURY, VERMONT, A CORPORATION OF VERMONT.

SCALE.

Original No. 1,385,592, dated July 26, 1921, Serial No. 352,817, filed January 20, 1920. Application for reissue filed May 8, 1926. Serial No. 107,823.

This invention relates to scales, and more particularly to high capacity scales which are adapted for installation with railway tracks to weigh cars and other heavy loads.

It is an object of the invention to provide an improved scale of the character mentioned which is relatively simple in construction and reliable and exact in function under all conditions of service.

It is another object to provide an improved trade scale embodying a system of levers for transmitting load stresses, and in which torsional strains in the levers are avoided by means of improved connections therebetween.

Another object is to provide an improved scale employing a series of load transmitting levers, and means for supporting said levers and assuring the maintenance thereof in accurate operative alinement under all conditions.

Another object is to provide an improved scale wherein dimensional changes of expansion and contraction due to temperature variations are ineffective to disturb the weighing precision of the apparatus.

It is also an object to provide an improved heavy duty scale wherein the several levers and their connecting means are of increased strength and durability, and wherein the assembly thereof is facilitated.

A still further object is to provide an improved scale having its main levers formed with an opening disposed along the longitudinal center line of such levers, with spaced apart alined pivots carried by the levers in said opening but on each side of the levers whereby there is provided an unrestricted vertically disposed well in the body of the levers, which well is adapted to have inserted therein suitable load transmitting means that are supported by the spaced apart pivots in such a manner as to be movable in a plurality of planes.

A further object is to provide a scale of the character referred to wherein certain of the parts in combination and in sub-combination are structurally superior and functionally advantageous.

Other objects and advantages will be in part apparent from and in part noted hereinafter in connection with the following description of an exemplary but preferred embodiment of the invention shown in the accompanying drawings, in which Figure 1 is a schematic view of the system of levers employed;

Figure 1:
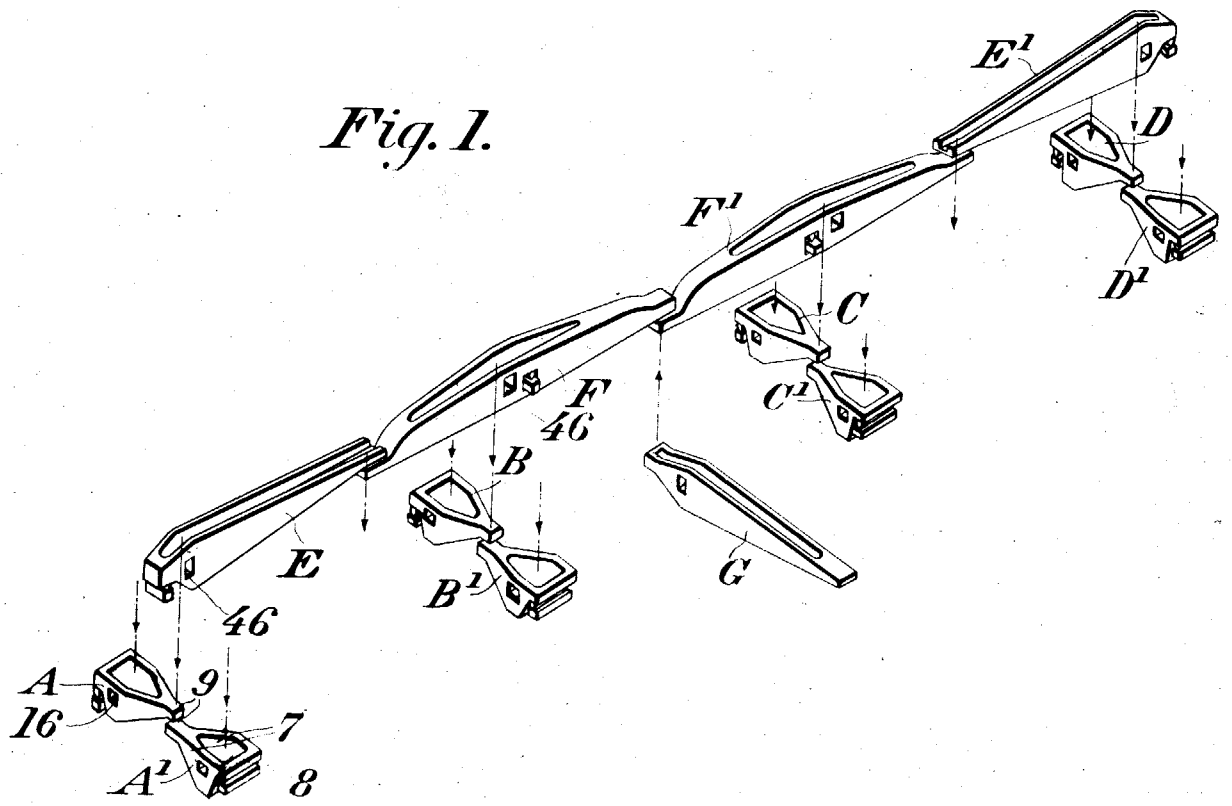

Referring more particularly to the illustrated embodiment of the invention and the general layout of Fig. 1, four spaced pairs of main levers (designated A A′, B B′, C C′ and D D′) are employed to receive the superposed load and transmit the same proportionally to extension levers (designated E E′ and F F′) which in turn transmit a predetermined reduction of the load to a fifth lever G adapted for connection with a suitable weight indicating mechanism. Each main lever is connected to its comparison member and to the superposed extension lever by means constructed and associated to transmit the pull incident to the load being weighed in a line substantially coinciding with the intersection of the center planes through the thus connected main and extension levers. In order to permit this construction, each lever, as will hereinafter be more fully described, is formed with spaced side walls through which the load transmitting means extends.

Figure 2:
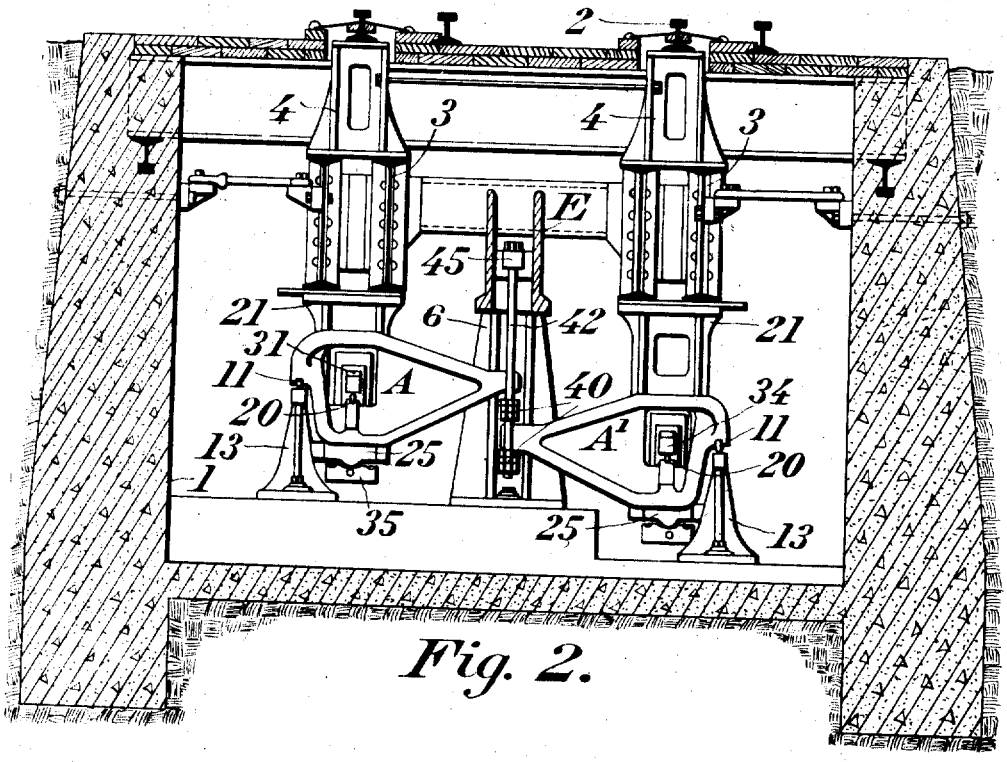
Fig. 2 is a vertical transverse section through one end of a scale pit showing the installation of the lever system therein, the superstructure being shown in section and the main levers at one end of the scale being shown in elevation.

The several pairs of main and extension levers are adapted to be arranged in a pit 1 (Fig. 2) beneath a track 2. Parallel longitudinal girders 3 which are suitably connected to form a skeleton platform, overlie the main levers, and these girders carry stands 4 to support the track rails. The girders are so disposed as to transmit the load stresses to the main scale levers through connections shown in Figs. 2, 4, 5, 6 and 7, and to be described.

Figure 3:
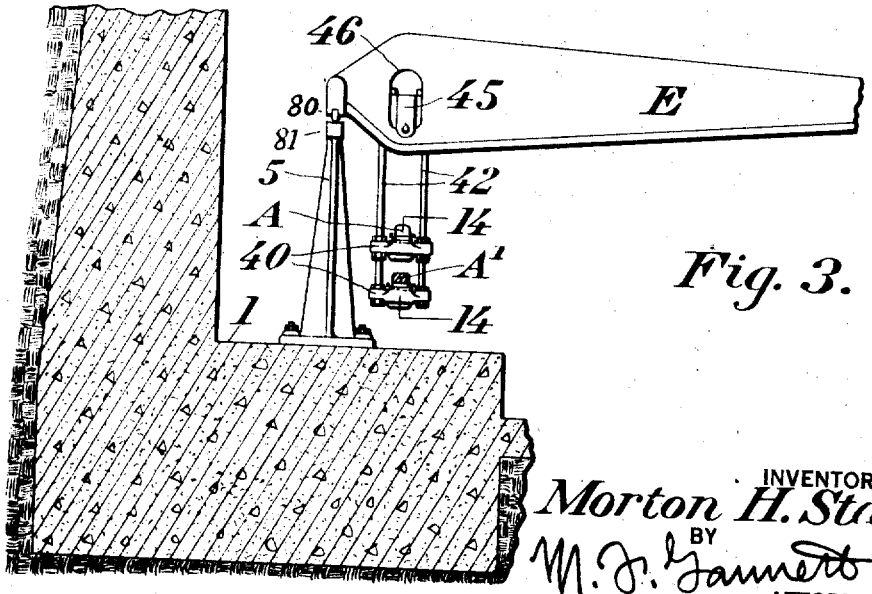
Fig. 3 is a vertical section taken at right angles to Fig. 2, showing particularly one of the end extension levers.
Figure 13:
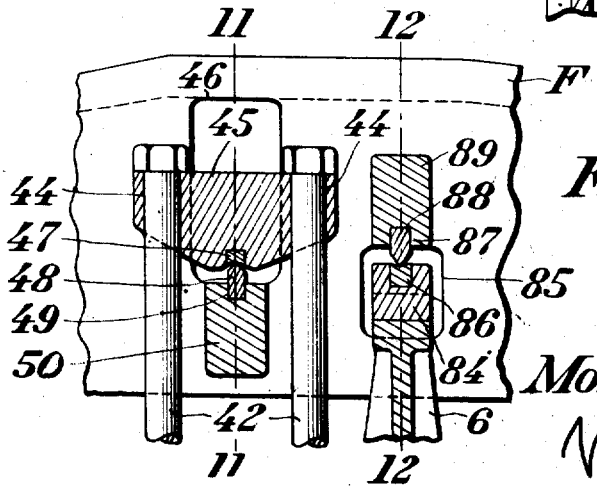
Fig. 13 is a longitudinal section of a center extension lever taken on the line 13—13 of Fig. 9.

The train of extension levers, as referred to, comprising the end extension levers E E′, and the center extension levers F F′, are mounted longitudinally the scale pit, between the girders 3, the levers E and E′ having their rear ends pivotally supported, such as by means of a stand 5 (Fig. 3) while the levers F F′ are pivotally supported midway their length, such as by means of a stand 6 (Fig. 13). The free end of each end extension lever is connected to the adjacent end of a center extension lever, and the adjacent ends of the center extension levers are connected together and to the fifth lever G by improved connecting means which will be hereinafter more fully described, such means being designed to transmit the load stresses in the vertical center planes of movement of the respective levers so as to avoid torsional and binding strains.

As shown more particularly in Figs. 4, 5, 6 and 7, each main lever comprises spaced side walls 7, which are integrally connected to provide a rear or butt end 8, and a front or tip end 9, such walls being also connected by one or more intermediate vertically disposed webs 10.

Mounted in the butt 8 of each main lever is a depending knife edge pivot 11 adapted to seat in a concaved bearing 12 carried by the upper end of a stand 13. Likewise, the tip 9 of each main lever is provided with a depending knife edge pivot 14, that is adapted to co-operate with suitable means, to be described, whereby load stresses will be transmitted from the main levers to the end extension levers.

In order that each main lever can withstand excessively heavy load stresses, the butt 8 is made considerably wider than the tip 9, and the pivots 11 and 14 have a length substantially corresponding to the width of the portion of the lever in which they are mounted. The side walls 7 are formed parallel with each other adjacent the butt end of the lever, and in the forward part of such lever these walls merge towards the narrower tip so that the lever, in plan, has an appearance approximately similar to the letter A (see Fig. 4). On the other hand, by referring to Figs. 2 and 5, it will be noticed that each side wall 7 is, in side elevation somewhat triangular in outline with the deepest part extending downwardly. The lever is constructed with this design so as to provide the portion of the lever immediately forward of the butt thereof with considerable depth for reinforcing purposes, and in the present instance such portion includes the part of the lever having the parallel side walls. As shown, the webs 10 are preferably located forward of this portion of the lever.

Figure 7:
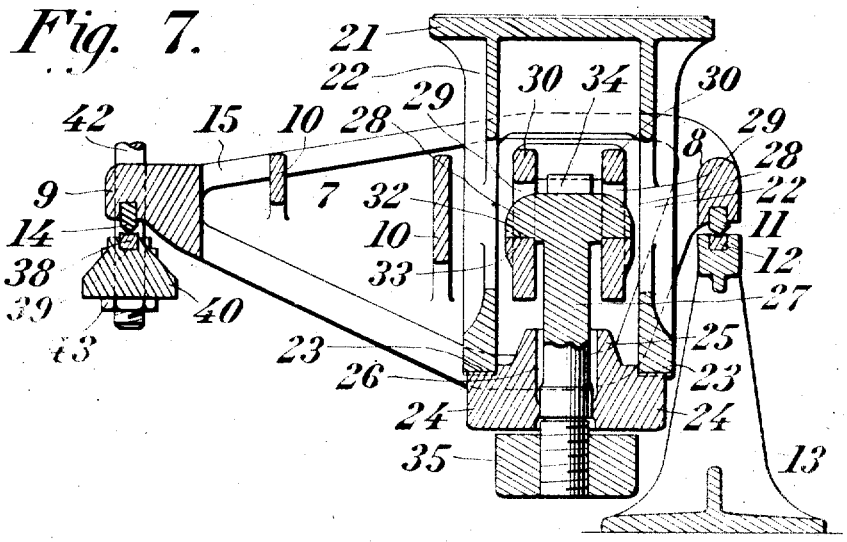
Fig. 7 is a longitudinal section taken approximately on the line 7—7 of Fig. 6.
Figure 6:
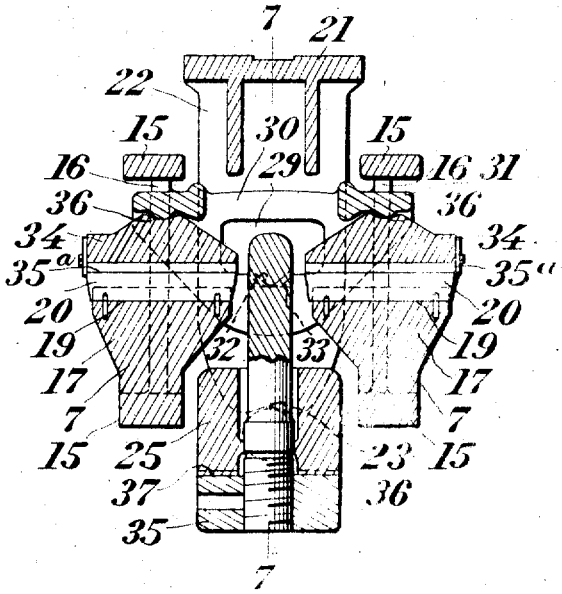
Fig. 6 is a transverse section taken approximately on the line 6—6 of Fig. 4.
Figure 9:
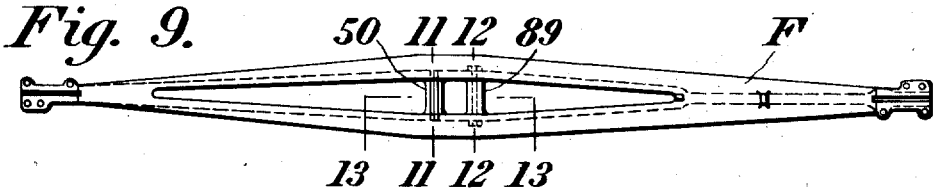
Fig. 9 is a plan of one of the center extension levers.
Figure 10:
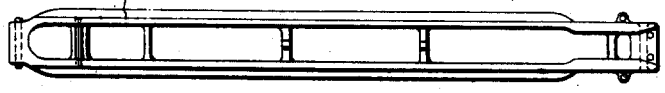
Fig. 10 is a similar view of one of the end extension levers.

The side walls 7 of each main lever are, in cross section, in the form of an I, and as shown in Figs. 6 and 7, such side walls are constructed with a relatively thin vertical web around the edge of which is a flange 15.

The flange merges with the butt at one end and also with the tip at the other end, and the construction is such that a unitary structure is formed, which structure is reinforced to provide a member of great strength.

In the present instance the side walls of the main levers, adjacent the butt 8 thereof, are formed with rectangular alined openings 16, which openings are disposed in the webs of the side walls immediately below the top flange 15. Each of the openings 16, as will be seen from Fig. 6, have a transversely disposed boss 17 formed in their lower edge, which boss is connected to the lower flange 15 of the lever walls by reinforcing ribs 18. The bosses 17 have a channel 19 formed longitudinally in their upper faces for the reception of a knife edge pivot 20 which is tightly fixed therein.

The disposition of the bosses and the pivots carried thereby is such that there is formed a scale lever having spaced side walls, in which walls are mounted spaced apart alined knife edge pivots that are located on each side of the longitudinal center line of the lever. By this construction the usual continuous load pivot has been discarded, and in its place there is a pair of alined pivots which, although each are of shorter length than the length usually required for a single load pivot, have a combined length greater than is usually required. Furthermore, it will be observed that by mounting the spaced alined pivots 20 so that they do not intersect the longitudinal center line of the lever, I have provided a vertical passageway that is centrally disposed in the lever. With this construction of a lever, I am enabled to employ means for transmitting the load stresses through the lever, which means can be so mounted in the lever whereby the load stresses can be transmitted through the lever at the point of intersection of the transverse line provided by the pivots 20 with the longitudinal center line of the lever.

Load stresses are transmitted from the scale platform to the respective main levers through chairs 21 which are mounted in the levers and which support the girders 3.

Each girder chair is composed of a casting having spaced depending legs 22 that are disposed in the vertical passage-way between the spaced side walls 7 of the lever so as to straddle the pivots 20 and other associated parts to be described. The extremities of the legs 22 are provided with concave recesses 23 arranged to contact with trunnions 24 on an adjustable trunnion block 25 that is positioned in each main lever beneath the pivots 20 thereof.

The trunnion block has a central vertical opening 26 through which extends a suspension bolt 27. The bolt is provided with laterally projecting lugs 28 at its upper end to provide a T-shaped head arranged to extend into openings 29 in the spaced side walls 30 of a saddle member 31. The lower surface of each of the lugs 28 of the suspension bolt is formed so as to provide a defined edge functioning as a pivot 32 for seating in concaved bearing surfaces 33 formed in the side walls 30 of the saddle.

It will be noticed that the depending legs of the girder chair, as well as the trunnion 24 of the block 25 and the T-shaped head of the suspension bolt 27 are all arranged in the lever along the longitudinal center line thereof and at right angles to the knife edge pivots 20, while the saddle member, which is of rectangular skeleton form, is arranged transversely of the longitudinal center of the lever so that its ends overlie the pivots 20.

Figure 4:
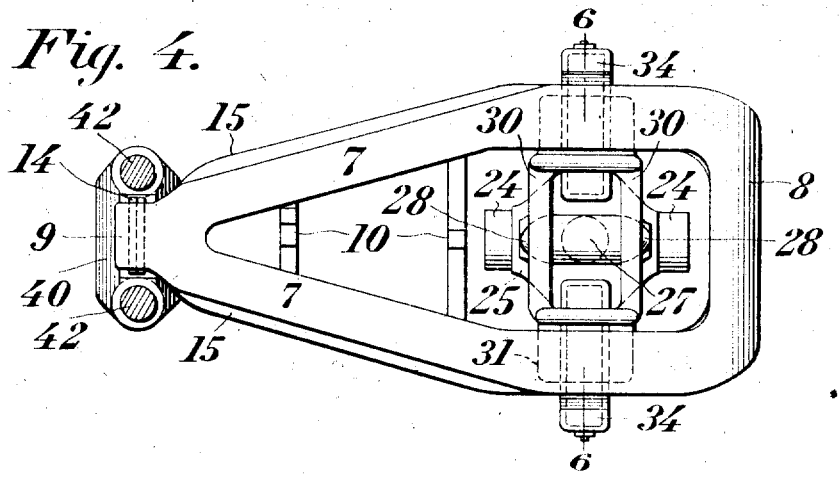
Fig. 4 is a plan of one of the main levers, a portion of the load transmitting means being shown mounted therein.
Figure 5:
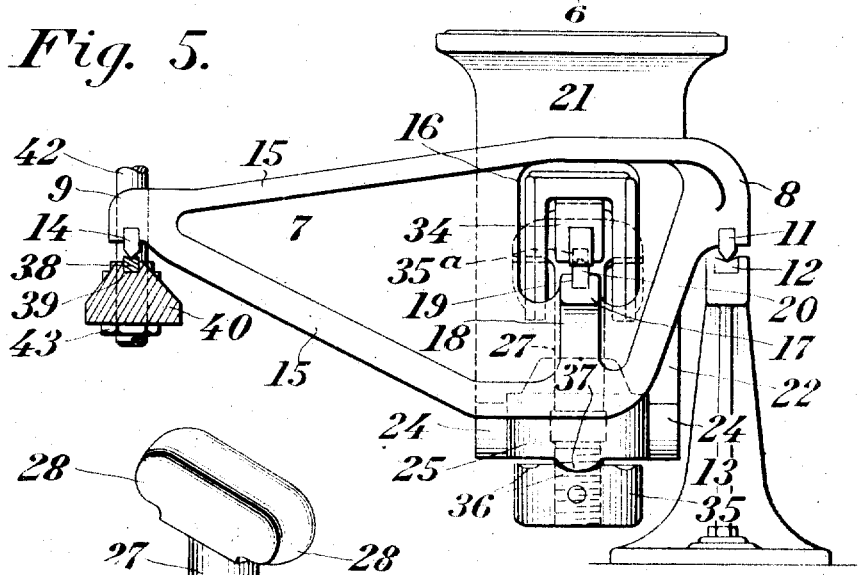
Fig. 5 is a side view of the structure shown in Fig. 4, one of the girder chairs that are carried by the load transmitting means being shown mounted in the lever.
Figure 8:
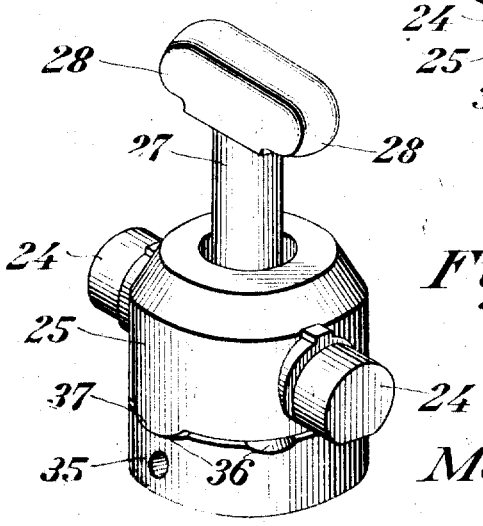
Fig. 8 is a detail perspective view of the suspension bolt used in connection with the main levers shown in Figs. 4 to 7.

Bearing blocks 34 fitted with concave bearing seats 35ª to receive the knife edge of the pivots 20 are mounted in the openings 16 in the side walls 7, as shown more clearly in Figs. 4, 5 and 6, and the ends of the saddle 31, which also extend through the openings in the side walls 7, are adapted to seat in recesses 36 in the upper faces of the bearing blocks 34.

The arrangement of the parts is such that there is ample clearance between the pivots 20 for the bolt 27 which is centrally disposed in the opening in the lever. Thus the bolt is boxed in the registering openings between the side walls of the lever and of the saddle and centrally of the bearing seats thereof, the vertical longitudinal center line of the bolt being positioned coincident with the intersection of the longitudinal center line of the lever with the transverse pivot line thereof.

The bolt is threaded on its lower end and a nut 35 is screwed thereon for the purpose of adjustably positioning the trunnion block 25 to govern the relative vertical disposition of the girder chair 21 with respect to the corresponding main lever. This adjusting nut may also be provided on its upper surface with a plurality of radial recesses 36, and the trunnion block 25 may have a pair of complementary projections 37 adapted to engage in a pair of said depressions to lock the members against relative rotation.

There is thus formed a pivotal support between the girder chair and the main lever wherein the pivotal axis extends longitudinally and centrally of the main lever between the side walls 7 and whereby slight movement of the girder chair transversely of the lever is permitted.

The construction described provides in effect a universal joint between the girder chair and main lever. At the same time the disposition of the pivotal bearing joints is such that the load is transmitted substantially linearly at the intersection of the center planes of the girder and the main lever. Furthermore the construction described is of especial advantage in that the castings and parts are capable of ready manufacture and expeditious assembly; that is to say, the bearing blocks 34 may be readily placed on the pivots 20, the saddle 31 then positioned and the suspension bolt 27 installed from above with its top projections 28 turned to pass between the side walls of the saddle until the projections are opposite the saddle wall openings whereupon the suspension bolt is turned to position the projections 28 in the side wall openings of the saddle whereby the pivots 32 of the bolt can be seated in the bearings 33 of the saddle. The trunnion block 25 and nut 35 are then positioned upon the depending end of the suspension bolt from below. The girder chair 21 straddles the saddle 31 and the suspension bolt and may be thus readily positioned.

Figure 11:
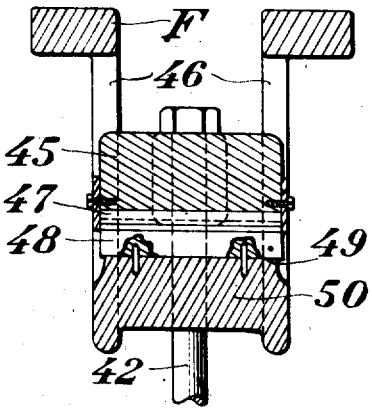
Fig. 11 is a transverse section taken approximately on the line 11—11 of Figs. 9 and 13 and showing part of the connections between a pair of main levers and one of the center extension levers.
Figure 14:
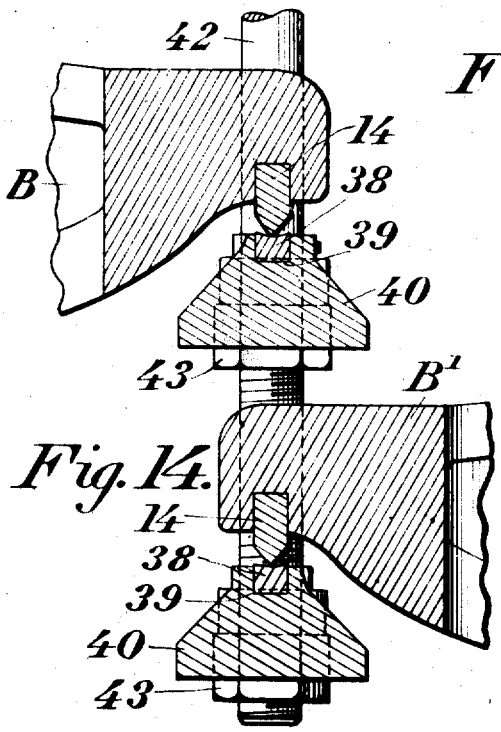
Fig. 14 is a detail section of the connections between adjacent ends of two main levers taken approximately on the line 14—14 of Fig. 3.

The connections for transmitting the load stresses from the several pairs of main levers to the corresponding extension levers are similar in each instance, and Figs. 11, 13 and 14 shows details of the typical connection between one pair of main levers and one of the extension levers. As here shown, the free ends of the main levers overlap in the plane of and below the extension lever, one being disposed above the other and spaced therefrom, and each having its pivot 14 seated on a concaved bearing 38 suitably secured in a groove 39 in the upper surface of a bearing block 40. Each bearing block 40 has apertures 41 through the end portions thereof through which extend the lower threaded ends of spaced bolts 42. Nuts 43 screw on the bolts and are arranged to engage the under surfaces of the bearing block 40 and to support the latter in adjusted position to receive the load.

The free ends of the main levers thus extend between the supporting bolts 42 and are arranged to transmit the load stress through the pivots 14 to the respective bearing blocks 40 and thence through the bolts 42 to the corresponding extension levers.

The bolts 42 are headed at their upper ends and pass though apertures 44 in an upper bearing block 45 disposed between the webs of the extension lever and extending into side openings 46 in said webs. This bearing block 45 has a concaved seat 47 mounted in the under surface thereof and arranged to receive a knife edge pivot 48 which is suitably secured in a groove 49 in a transverse integral web 50 between the side walls of the extension lever.

The connection described provides ready adjustment of the parts and permits easy replacement when desired and also provides for the transmission of the load stresses in the center planes of movements of the levers, that is to say, substantially linearly in the intersection of the center planes of pivotal movement of the main and extension levers.

Figure 18:
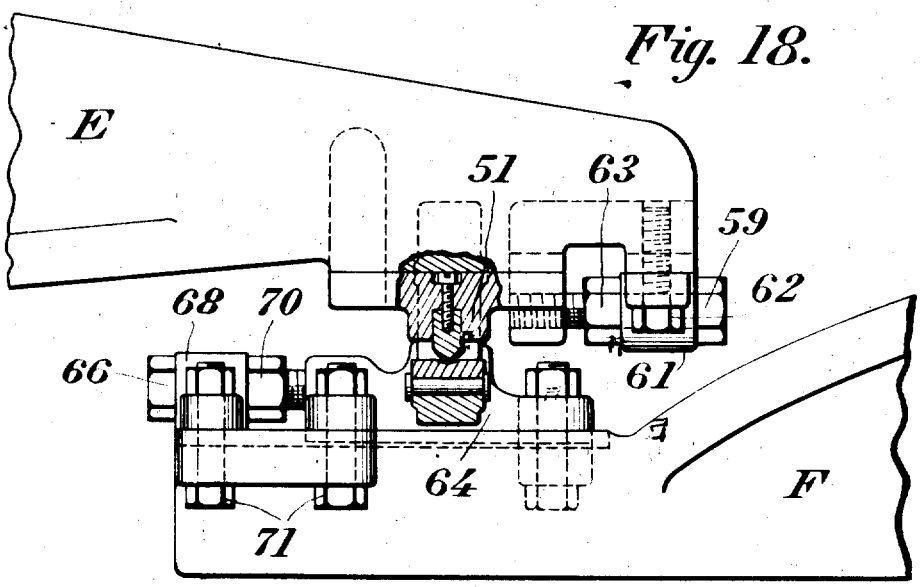
Fig. 18 is a fragmentary side elevation of the adjacent ends of the center and end extension levers, certain parts being shown in section, as seen from the line 18—18 of Fig. 17.
Figure 16:
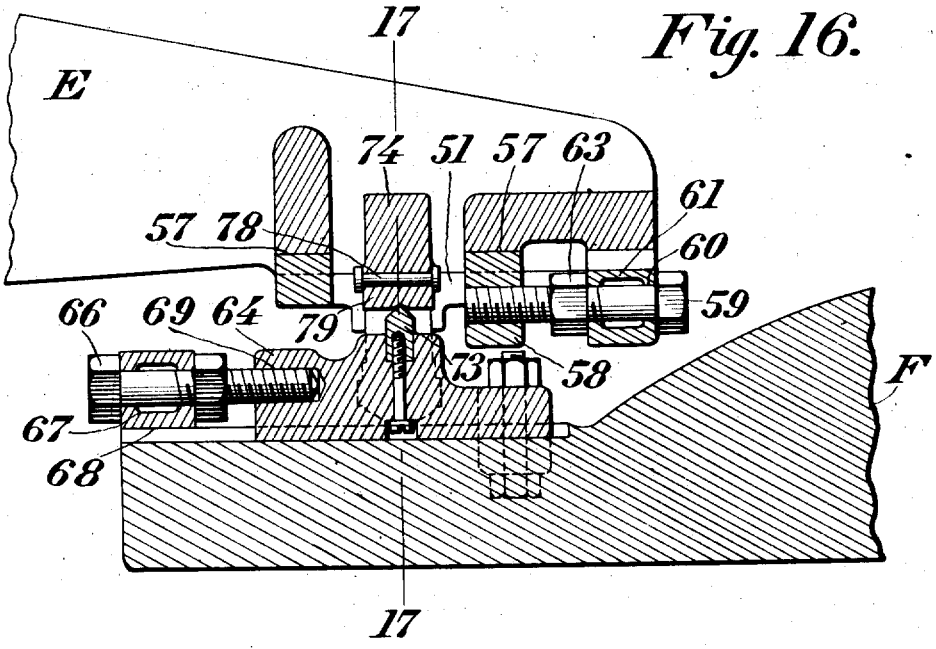
Fig. 16 is a fragmentary vertical longitudinal section showing the pivotal connection between a center extension lever and an end extension lever.
Figure 17:
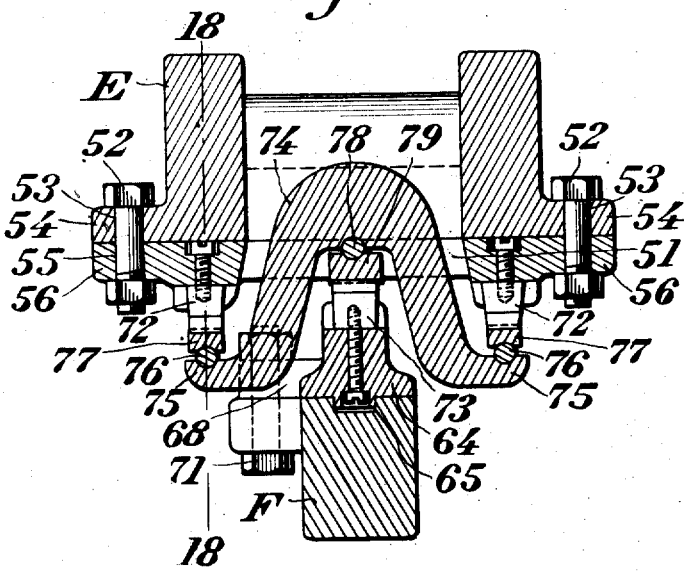
Fig. 17 is a vertical transverse section taken on the line 17—17 of Fig. 16.

From each of the end extension levers E E′ load stresses are transmitted to the center extension levers F F′ through bearings and connections designed to transmit the forces approximately in the longitudinal vertical center planes of movement of the levers, so as to prevent unequal wear of the bearings and to avoid torsional and binding strains in the levers themselves. By this construction the accuracy of the scale is enhanced and its effective life prolonged. The details of these connections are the same and are shown particularly in Figs. 16, 17 and 18. As there illustrated, each comprises an adjustable nose iron 51, preferably cast metal, which is secured to the end extension lever E as by bolts 52 passing through openings 53 in flanges 54 of the lever and through openings 55 in laterally extending flanges 56 of the nose iron. The extension lever is also fitted with a longitudinally extending groove 57 in which projections 58 of the nose iron are slidably mounted. A projection 58 on the nose iron is apertured and internally threaded to receive the threaded end of an adjusting bolt 59 which also passes through an opening 60 in the casting 61 secured to the tip of the lever E as by suitable screws 62, and is fitted with a lock nut 63. An adjustable nose iron 64 somewhat similar to casting 51 is also mounted on the upper surface of the end of center extension lever F to be longitudinally adjustable in the groove 65. An adjusting bolt 66 passes through an aperture 67 in a casting 68 and is threaded at its end to engage a threaded recess 69 in the nose iron 64. This bolt is also fitted with a lock nut 70 to hold the nose iron in adjusted position. The casting 68 may be secured to the tip end of the center extension lever F by suitable bolts 71.

On each side of the longitudinal center line of casting 51 a short knife edge pivot 72 is secured transversely of the lever and a similar knife edge pivot 73 is secured centrally of the nose iron 64.

Extending transversely of the extension levers is an inverted U-shaped connection or bearing yoke 74 having laterally projecting lugs 75 at the outer extremity of the arms thereof, and the upper surfaces of these lugs are channeled to receive bearing spools 76, preferably of hardened steel and circular in cross-section. A bearing seat 77 rests on each of the spools mentioned and is engaged by the pivots 72 cooperating to transmit the load from the end extension levers to the center extension levers. The throat of the U-shaped yoke 74 is channel to receive a bearing spool 78 on which rests a bearing seat 79 disposed to receive pivot 73 above mentioned. The pivotal connection described allows free relative pivotal movement of the extension levers and constitutes a strong and stable connection therebetween.

It will thus be evident that the connection described transmits the load stress from the end extension levers to the center extension levers in the plane of movement of said levers, that adjustment in length of the relative lever arms for sealing the scale is facilitated, and that the various parts are capable of ready assembly or removability when desired.

Figure 12:
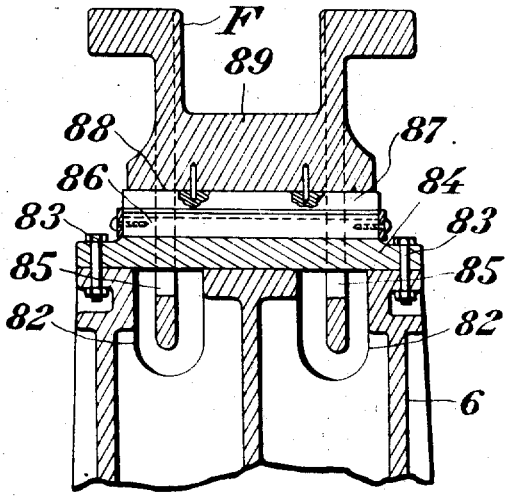
Fig. 12 is a transverse section taken approximately on the line 12—12 of Figs. 9 and 13 and showing the pivotal mounting between a center extension lever and its supporting stand.

The end extension levers E E′ which carry pivots 80 of substantial length, are supported at their outer ends on concaved bearings 81 mounted in the top of the stands 5. The stand 6 for the center extension levers F F′ has a central web having recesses 82 in its upper edge and into which recesses extend the side webs of the center extension lever (see Figs. 12 and 13). Suitably secured to the upper surface of the stand 6, as by bolts 83, is a transverse block 84 extending through openings 85 in the side walls of the extension lever and supported by and secured to which is a concave bearing 86 to receive a knife edge pivot 87 in turn mounted in a groove 88 in the under surface of a transverse web 89 between and integral with the side walls of the extension lever. The load on the center extension lever from the end extension lever is thus carried by the knife edge pivotal connection to the stand 6.

Figure 19:
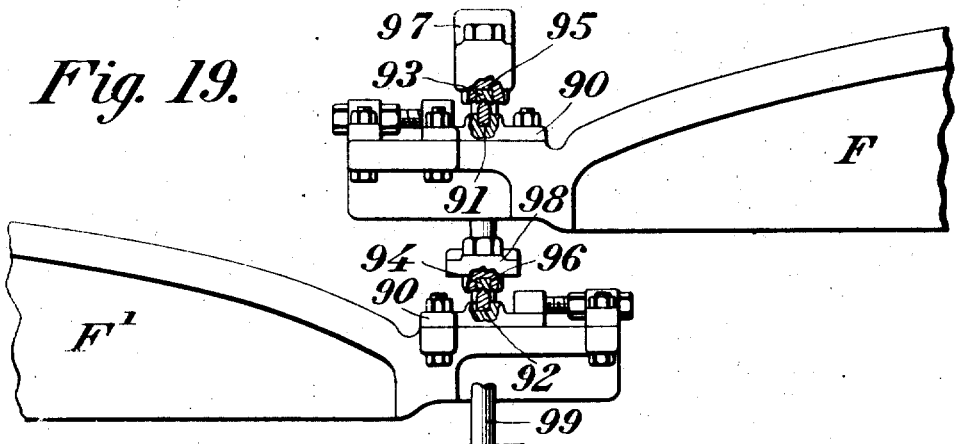
Fig. 19 is a fragmentary elevation of the connection between the adjacent ends of the two center extension levers and the fifth lever, certain parts being shown in section to more clearly disclose the details of construction.
Figure 20:
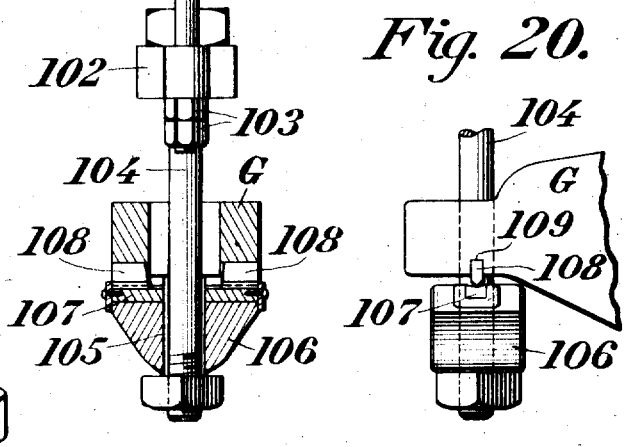
Fig. 20 is a detail elevation of a portion of Fig. 19 taken at right angles.
Figure 21:
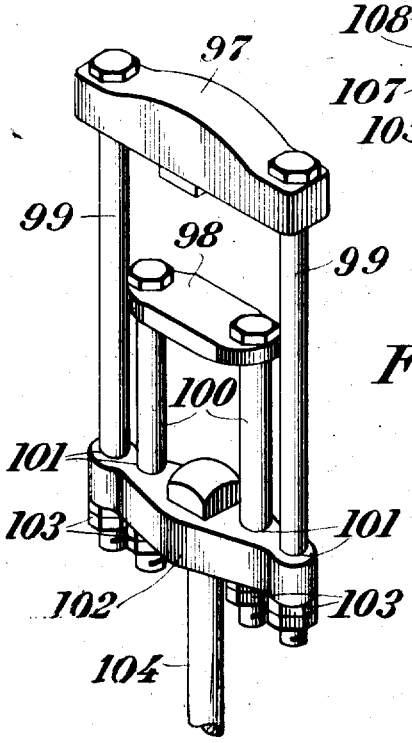
Fig. 21 is a perspective view of the parts used in the connection of the center extension levers with the fifth lever.

The connections between the ends of the extension levers F F′ and the end of the transverse lever G are shown particularly in Figs. 19, 20 and 21. As there illustrated, the end of one center extension lever overlaps the end of the other in a vertical plane and the overlapping ends are connected to the end therebelow of the transverse lever which may be arranged at any desired angle to the extension levers. Longitudinally adjustable nose irons 90 similar in general to the nose iron 51 above described, are mounted on the upper surfaces of the ends of levers F F′, respectively, whereby knife edge pivots 91 and 92 carried thereby may be adjusted and locked in vertical alinement and the scale correctly sealed. The knife edge pivots 91, 92 seat against concaved bearings 93 and 94 mounted in grooves 95 and 96 in the under surfaces of transverse bearing blocks 97 and 98, respectively. These bearing blocks are apertured at their ends to receive pairs of tension bolts 99 and 100, respectively. The bearing block 97 is longer than the bearing block 98 (Fig. 21) so that bolts 99 are disposed outside of the bolts 100 and bearing block 98. The lower ends of the two pairs of tension bolts are threaded and extended through vertically alined end openings 101 in a complementary transversely disposed yoke 102. A plurality of nuts 103 are threaded on the lower ends of the bolts 99 and 100 whereby the yoke 102 may be positioned to receive equally the load forces transmitted through the center extension levers F F′. The yoke 102 is also centrally apertured to receive the upper end of a headed tension bolt 104, the lower end of which passes through a central opening 105 in a bearing block 106 disposed beneath the inner end of the transverse lever G. This bearing block is fitted with spaced concave bearings 107 at opposite sides of the aperture 105 to receive the knife edge pivots 108 suitably mounted in grooves 109 in the under surface of the inner end of the transverse lever G, which is also apertured centrally to provide clearance therethrough for the bolt 104.

By the construction described it will thus be seen that the load stresses are here also transmitted in the planes of said levers, and substantially in a line coincident with the intersection of the center planes of movement of the extension levers and the fifth lever, respectively. Consequently torsional strains and unequal wear of the bearing parts are avoided.

Figure 22:
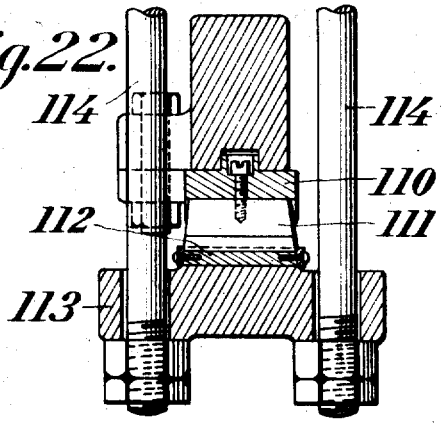
Fig. 22 is a vertical transverse section of the free end of the fifth lever showing the means employed to transmit the load stresses from the lever mechanism to the weight indicating mechanism.
Figure 15:
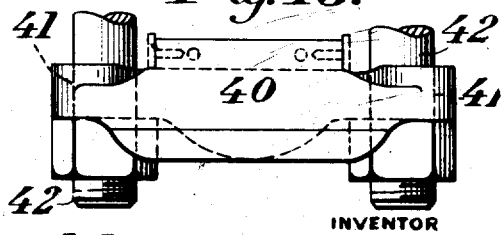
Fig. 15 is an elevation of one of the bearing blocks shown in Fig. 14.

Suitable connecting means between the outer free end of the transverse lever G with the weight indicating mechanism are provided. As shown in Fig. 22, this connection includes a nose iron 110 adjustably mounted on the lower surface of the transverse lever and carrying a transverse knife edge pivot 111 to bear on the concaved bearing 112, in turn supported by a transverse bearing block 113. The block 113 is apertured at its ends to receive the lower ends of a V-shaped bolt or clevis 114 through which the load stresses are in turn transmitted to the weight indicating mechanism of the scales.

It will be understood that the various knife edge pivots and the concaved bearing seats therefor as employed through the lever system are of hardened steel or other suitable wear resistant material. It will be observed further that the knife edge bearings described are of graduated dimension, decreasing in length as the quantitative load force transmitted thereto decreases, but that in each instance the connection between levers is such as to provide adequate dimension of the pivotal bearing parts.

The sealing of the scale, as a whole, can be expeditiously effected by reason of the various adjustable connections whereby the respective lengths of the connecting lever arms are variable. The webbed construction of the levers, while of advantage in strength and durability, is of especial further superiority in combination with the improved connecting means between the levers as described.

The functional and structural objects above stated are thus seen to be obtained in the construction described. It is to be understood that certain features of the invention are capable of modification and combination in scales of other types without sacrifice of the attendant advantages.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is:—

1. In a scale, in combination, a lever having spaced alined pivots and an opening centered therebetween, and a load transmitting member disposed through said opening and having an operative connection member with said spaced pivots whereby said member is pivotally movable in a plurality of planes.

2. In a scale, in combination, a lever having spaced alined pivots and an opening centered therebetween, a rigid member having a pair of bearings cooperating with said pivots and having a centered opening registering with said first opening and having opposed bearings at the sides of said opening at substantially right angles to said pair of bearings, and a load transmitting member disposed through said openings and having alined pivots to cooperate with said opposed bearings.

3. In a scale, in combination, a rigid lever having spaced alined pivots and an opening centered therebetween, a load transmitting member disposed through said opening and having an operative connection with said spaced pivots whereby said member is pivotally movable in a plurality of planes, and a loading member having legs to straddle said first member and pivotally connected thereto below the plane of connection of said first member to said lever.

4. In a scale, in combination, a lever having spaced alined pivots and an opening centered therebetween, a rigid member having bearings cooperating with said pivots and having a center opening registering with said first opening and having opposed bearings at the sides of said center opening at substantially right angles to said pair of bearings, a load transmitting member disposed through said openings and having pivots to cooperate with said opposed bearings, and a loading member having legs to straddle said first member and pivotally connected thereto below the plane of connection of said first member to said lever.

5. In a scale, in combination, a rigid lever having spaced alined pivots and an opening centered therebetween, a rigid saddle having a pair of bearings cooperating with said pivots in one horizontal plane and having a center opening registering with said first opening and having opposed bearings at the sides of said center opening at substantially right angles to said pair of bearings, and a load transmitting member disposed through said openings and having pivots to cooperate with said opposed bearings in a horizontal plane below said first mentioned plane.

6. In a scale, in combination, a rigid lever having spaced alined pivots and an opening therebetween, a rigid saddle having a pair of bearings cooperating with said pivots in one horizontal plane and having an opening registering with said first opening and having opposed bearings at the sides of its said opening at substantially right angles to said pair of bearings, a load transmitting member disposed through said openings and having pivots to cooperate with said opposed bearings in a horizontal plane adjacent said first mentioned plane, and a loading member having legs to straddle said saddle and pivotally connected to said load transmitting member in a plane below both of said first mentioned planes.

7. In a scale, in combination, a rigid lever having spaced alined pivots and an opening therebetween, a load member having spaced legs disposed through said opening, a load transmitting member disposed through said opening and between said legs, cooperating bearings between the lower end of said second member and the legs of said first member to permit pivotal movement of the latter at right angles to the plane of movement of said lever, and an operative connection between the upper end of said second member and the pivots of said lever to permit pivotal movement of said second member in planes parallel and at right angles to the plane of pivotal movement of said lever.

8. In a scale, in combination, a rigid lever having spaced alined pivots and an opening therebetween, a load member having spaced legs disposed through said opening, and connecting means between said lever and said member to transmit the load stresses substantially in a line centrally between said pivots and said legs.

9. In a scale, in a combination, a rigid lever having spaced alined pivots and an opening therebetween, a load member having spaced legs disposed through said opening and at right angles to the plane of movement of said lever, and connecting means between said lever and said member to transmit the load stress substantially in a line centrally between said pivots and said legs.

10. In a scale, in combination, a rigid lever having spaced alined pivots and an opening therebetween, a load member having spaced legs disposed through said opening, and connecting means between said lever and said member including an element disposed centrally between said spaced pivots and said legs.

11. In a scale, in combination, a rigid lever having spaced alined pivots and an opening therebetween, a load member having spaced legs disposed through said opening, and connecting means between said lever and said member including an element disposed centrally between said spaced pivots and said legs and having a pivotal connection at its upper end with said lever and a pivotal connection at its lower end with said legs.

12. In a scale, in combination, a rigid lever having spaced alined pivots and an opening therebetween, a load member having spaced legs disposed through said opening, and connecting means between said lever and said member including a bolt disposed centrally between said spaced pivots and said legs and having a pivotal connection at its upper end with said lever and a vertically adjustable pivotal connection at its lower end with said legs.

13. In a scale, in combination, a rigid lever having spaced alined pivots and an opening therebetween, a load member having legs disposed through said opening, a load transmitting element disposed between said legs and through said opening, and pivotal connections between said element and said legs and between said element and said lever whereby said element may swing relatively to said load member in one plane and relatively to said lever in a plurality of planes.

14. In a scale, in combination, a rigid lever having spaced alined pivots and an opening therebetween, a load member having legs disposed through said opening, a load transmitting element disposed between said legs and through said opening, and pivotal connections between said element and said legs and between said element and said lever, whereby said element may swing relatively to said lever in the plane of movement of the latter and at right angles thereto.

15. In a scale, in combination, a rigid lever fulcrumed at one end and arranged to transmit the load through its other end and having spaced transversely alined pivots intermediate its ends and an opening between said pivots, and a load transmitting member disposed through said opening and having an operative connection with said spaced pivots whereby said member is pivotally movable with respect to said lever in the plane of pivotal movement of the latter and in a plane at right angles thereto.

16. In a scale, in combination, a rigid lever having spaced side walls connected at their ends, said side walls having transversely registering apertures with thickened portions therebelow with alined pivots, a rigid saddle having spaced side walls connected at their ends, said saddle extending through said openings in said lever side walls and having end bearings to cooperate with said pivots, and a load transmitting member suspended from said saddle centrally between the side walls thereof and the side walls of said lever.

17. In a scale, in a combination, a rigid lever having spaced side walls with registering openings therein, a rigid saddle having spaced side walls with registering openings therein, said saddle extending transversely through said openings of said lever, bearings between the ends of said saddle and the side walls of said lever, a load transmitting member disposed vertically and centrally between the side walls of said saddle and the side walls of said lever and bearings between said member and the side walls of said saddle.

18. In a scale, in combination, a rigid lever having spaced side walls with transversely registering openings therethrough, a rigid saddle having spaced side walls with registering openings therethrough, said saddle extending transversely through the openings of said lever, and a load transmitting member extending vertically and centrally between the side walls of said lever and the side walls of said saddle and having opposed bearing projections extending through the openings of said saddle.

19. In a scale, in combination, a rigid lever having spaced side walls with registering openings therethrough, a rigid saddle having spaced side walls with registered openings therethrough, said saddle being insertible transversely of said lever through the openings of the latter, and a load transmitting member having opposed upper bearing extensions, said member being insertible vertically between said side walls of said saddle and being rotatable thereafter to extend said bearing projections through said openings of said saddle.

20. In a scale, in combination, a rigid saddle having spaced side walls, bearings for the ends of said saddle, a load transmitting member extending between the side walls of said saddle and suspended vertically therefrom, a trunnion supported at the lower end of said member, and a loading element having spaced legs to straddle the side walls of said saddle and to engage with said trunnion.

21. In a scale, in combination, a plurality of spaced parallel pairs of pivoted main levers, the levers of each pair being arranged end to end, a load member for each main lever having a pivotal movement at right angles to the pivotal movement of the corresponding main lever, a plurality of pivoted extension levers arranged end to end disposed at right angles to said main levers, a pivoted transverse lever extending at an angle to said extension levers, and operative connections therebetween to transmit the load stresses from said members through said main levers through said extension levers to said transverse lever in lines substantially coinciding with the respective intersections of the center planes of pivotal movement thereof.

22. In a scale, in combination, a girder chair, a main lever and connecting means therebetween for transmitting load stresses, said means including spaced knife edge pivots and a suspension member cooperating with said chair and arranged to transmit the stresses centrally of said pivots.

23. In a scale, in combination, an end extension lever and a center extension lever, said levers being arranged end to end, a pivotal connection between said levers including an inverted U-shaped saddle having a central bearing on one of said levers and end bearings on the other of said levers.

24. In a scale, in combination, a pair of levers for transmitting load stresses from one to the other, nose irons on the adjacent ends of said levers, and a bearing therebetween including an inverted U-shaped saddle co-acting centrally with one of said nose irons and coacting at its ends with the other nose-iron.

25. In a scale, in combination, two levers for transmitting load stresses, a bearing therebetween including a saddle having transversely extending supporting lugs, a bearing spool and a bearing block supported on each of said lugs, and a bearing spool and a bearing block disposed centrally of said saddle and on the opposite side thereof with respect to said first mentioned bearing spools and bearing blocks.

26. In a scale, in combination, a pair of levers having pivotal bearings arranged in different horizontal planes, a lever disposed at an angle with respect to said first mentioned levers, and below said bearings and independent connections between said pair of levers and said lever, said connections being supported by said bearings.

27. In a scale, in combination, a pair of levers having overlapping ends, one above the other, separate U-shaped means respectively embracing said ends and each having an extended bearing across one of the same, a transverse element having independent adjustable connections with each of said means, a transverse lever having spaced bearings and means connecting said spaced bearings and said element to transmit the load stress substantially in the line of intersection of the planes of movement of said levers.

28. In a scale, in combination, a pair of extension levers having spaced ends overlapping in the plane of load transmission, a transverse lever, a yoke, spaced connecting means between one of said levers and said yoke, spaced connecting means between the other of said levers and said yoke embracing said first connecting means, and connecting means between said yoke and said transverse lever.

29. In a scale, in combination, a pair of extension levers having spaced overlapping ends, a transverse lever, a yoke, spaced connecting means between one of said levers and said yoke, spaced connecting means between the other of said levers and said yoke embracing said first connecting means, and connecting means between said yoke and said transverse lever and embraced by both of said connecting means.

30. In a scale, in combination, a pair of overlapping extension levers, a transverse lever, bearing blocks pivotally engaging said extension levers, a yoke, transversely spaced connecting means between one of said blocks and said yoke embracing one of said levers, transversely spaced connecting means between the other of said blocks and said yoke embracing both of said levers, and connecting means between said yoke and said transverse lever.

31. In a scale, in combination, a plurality of spaced pairs of main levers, extension levers arranged end to end at right angles to said main levers and centrally above the latter, a transverse lever arranged at an angle to said extension levers and centrally with respect thereto and to said main levers, and operative connections between said main levers and cooperating extension levers and between adjacent extension levers, and between said transverse lever and cooperating extension levers whereby the load is transmitted substantially in the center plane of movement of each of said levers.

In testimony whereof I hereunto sign my name.

MORTON H. STARR.